United States Patent Office 2,960,532
Patented Nov. 15, 1960

2,960,532
ALKYLPHENYL 3,4-DICHLOROBENZOATES

David A. Gordon and John M. Corbett, Midland, Mich., assignors to The Dow Chemical Company, Midland, Mich., a corporation of Delaware No Drawing. Filed Aug. 1, 1958, Ser. No. 752,415

6 Claims. (Cl. 260—476)

The present invention relates to substituted-phenyl esters of 3,4-dichlorobenzoic acid and is directed to compounds corresponding to the formula

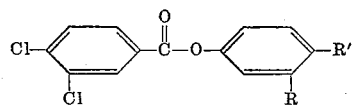

In this and succeeding formulas in the present specification and claims R represents hydrogen or methyl, and R' represents an alkyl radical containing from 1 to 8 carbon atoms inclusive. The novel 3,4-dichlorobenzoates are liquids or solids somewhat soluble in many common organic solvents and of low solubility in water. They are useful as parasiticides and as herbicides adapted to be employed in control of terrestrial plants and are also useful in compositions for the control of submerged aquatic vegetation.

The new compounds are prepared by causing a reaction between 3,4-dichlorobenzoyl chloride and a substituted phenol corresponding to the formula

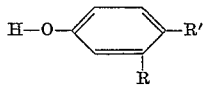

The reaction is carried out in an inert liquid reaction medium, and in the presence of hydrogen chloride neutralizing agent such as an alkali metal hydroxide. The process is somewhat exothermic and takes place smoothly in the temperature range of 10° to 30° C. with the production of the desired ester and hydrogen chloride of reaction. This hydrogen chloride appears in the reaction mixture as the product of reaction with the hydrogen chloride neutralizing agent, such as, for example, the salt. The temperature may be controlled by regulating the rate of contacting the reactants, and by external cooling. Good results are obtained when employing substantially equimolecular proportions of the 3,4-dichlorobenzoyl chloride reactant and the substituted phenol reactant and an amount of hydrogen chloride neutralizing agent at least stoichiometric with the acidic chlorine in the dicholorobenzoyl chloride. Upon completion of the reaction, when water is employed as reaction medium, the product occurs as a distinct organic phase which may be a liquid immiscible with aqueous reaction medium or as a solid which precipitates therein. When an organic liquid reaction medium is employed, byproduct chloride salt of hydrochloride neutralizing agent usually precipitates therein and may be separated by filtration, whereas the desired product usually remains in solution.

In carrying out the reaction, the dichlorobenzoyl chloride is added slowly portionwise with stirring, to a mixture consisting of the substituted phenolic reactant and hydrogen chloride neutralizing agent dispersed in the reaction medium which is preferably water. The contacting is carried out with cooling and stirring, and within the reaction temperature range. Stirring is thereafter continued for a period of time to carry the reaction to completion. When the reaction is carried out in water, product phase may be separated in known ways: e.g. if a liquid, in a separatory funnel, and if a solid, by filtration. If desired, the aqueous phase may be extracted with solvent such as diethyl ether to recover further product, and the extract combined with the organic product phase. Thereafter, the combined product phase may be purified in known methods such as recrystallization from solvent, and distillation.

The following examples illustrate the invention but are not to be considered as limiting.

Example 1.—3,4-dimethylphenyl 3,4-dichlorobenzoate

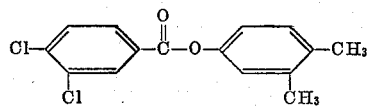

3,4-dichlorobenzoyl chloride (419 grams; 2 moles) was added dropwise over a period of one hour to a mixture consisting of 244 grams (2 moles) 3,4-dimethylphenol and 88 grams (2.2 moles) sodium hydroxide dispersed in 2 liters of water. The addition was carried out with stirring and at a temperature of from about 20° to about 30° C. Stirring was thereafter continued at the contacting temperature range for an additional 1.5 hours. The reaction mixture was then filtered and the residue washed with water, dried, and recrystallized from ethanol, to obtain a 3,4-dimethylphenyl 3,4-dichlorobenzoate product as a white solid melting at 63°–65° C.

Example 2.—4-secondary-butylphenyl-3,4-dichlorobenzoate

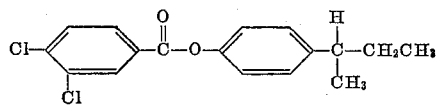

3,4-dichlorobenzoyl chloride (567 grams; 2.7 moles) was added dropwise over a period of 1 hour to a mixture consisting of 450 grams (3 moles) of para-secondary-butylphenol and 140 grams (3.5 mole) of sodium hydroxide and approximately 100 grams of ice, dispersed in 2 liters of water. The addition was carried out with stirring and at a temperature of from approximately 10° to approximately 30° C. Stirring was thereafter continued and the reaction mixture maintained at a temperature of from 10° to 30° C. for an additional 4 hours. The reaction mixture was then filtered and the residue washed with water, dried, and recrystallized from isopropanol. As a result of these operations there was obtained a 4-secondary-butylphenyl-3,4-dichlorobenzoate product as a white crystalline solid melting at 52.3°–53.1° C.

In similar manner, a 4-isopropylphenyl 3,4-dichlorobenzoate product was produced by reacting 3,4-dichlorobenzoyl chloride and 4-isopropylphenol in the presence of sodium hydroxide. After recrystallization from ethanol, the 4-isopropylphenyl 3,4-dichlorobenzoate product melted at 88°–89° C.

Example 3.—4-(1-methylbutyl)phenyl 3,4-dichlorobenzoate

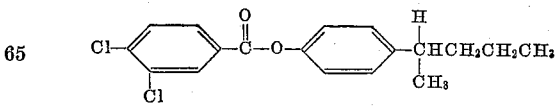

3,4-dichlorobenzoyl chloride (419 grams; 2 moles) was added dropwise over a period of 1 hour to a mixture consisting of 328 grams (2 moles) para-(1-methylbutyl)-phenol and 88 grams (2.2 moles) sodium hydroxide dispersed in 2 liters of water which was cooled in an ice bath. The addition was carried out with stirring and at a temperature of 15°–30° C. Stirring at the contacting temperature was thereafter continued for four hours to complete the reaction. During the course of the reaction, the reaction mixture separated into an aqueous layer and a liquid organic product layer. The organic layer was removed in a separatory funnel, washed with water, dried, and fractionally distilled. As a result of these operations there was obtained a 4-(1-methylbutyl)phenyl 3,4-dichlorobenzoate product as a colorless liquid boiling in the temperature range of 188° to 199° C. under 0.3 to 0.5 millimeters pressure.

*Example 4.—4-(1,1,3,3-tetramethylbutyl)phenyl 3,4-dichlorobenzoate*

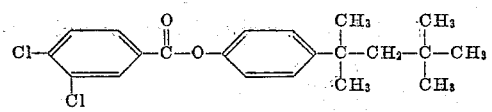

3,4-dichlorobenzoyl chloride (418 grams; 2 moles) was added dropwise over a period of 1 hour to a mixture consisting of 412 grams (2 moles) para-(1,1,3,3-tetramethylbutyl)phenol and 88 grams (2.2 moles) sodium hydroxide dispersed in three liters of water which was cooled in an ice bath. The addition was carried out with stirring and at a temperature of approximately 20°–25° C. Stirring was thereafter continued at the contacting temperature for an additional 3.5 hours. The reaction mixture was then filtered and the residue washed with water, dried, and recrystallized from isopropanol to obtain a 4-(1,1,3,3-tetramethylbutyl)phenyl 3,4-dichlorobenzoate product as a white crystalline solid melting at 74.2°–75.2° C.

The compounds of the present invention are useful as parasiticides and are adapted to be employed as active toxicants for the control of insect pests. In a representative operation, the application as a wetting spray of an aqueous composition containing 4-(1-methylbutyl)-phenyl 3,4-dichlorobenzoate in the concentration of 1 pound of toxicant per hundred gallons of ultimate composition to a population of bean aphids resulted in a 100 percent kill of the aphids.

I claim:

1. A compound corresponding to the formula

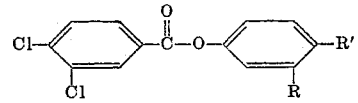

wherein R is a member chosen from the group consisting of hydrogen and methyl and R' is an alkyl containing from 1 to 8 carbon atoms inclusive.

2. 3,4-dimethylphenyl 3,4-dichlorobenzoate.
3. 4-secondary-butylphenyl 3,4-dichlorobenzoate.
4. 4-isopropylphenyl 3,4-dichlorobenzoate.
5. 4-(1-methylbutyl)phenyl 3,4-dichlorobenzoate.
6. 4-(1,1,3,3-tetramethylbutyl)phenyl 3,4-dichlorobenzoate.

References Cited in the file of this patent

UNITED STATES PATENTS

| | | |
|---|---|---|
| 2,665,301 | Monroe et al. | Jan. 5, 1954 |
| 2,666,039 | Reid et al. | Jan. 12, 1954 |